United States Patent
Okajima et al.

[19]

[11] Patent Number: 6,095,610
[45] Date of Patent: Aug. 1, 2000

[54] AUTOMOTIVE SEAT WITH ELECTRICALLY ACTUATED OTTOMAN

[75] Inventors: Masao Okajima; Masaaki Kogure, both of Kanagawa; Isao Hayashi; Mitsuru Terui, both of Yokohama, all of Japan

[73] Assignee: Ikeda Bussan Co., Ltd., Ayase, Japan

[21] Appl. No.: 09/321,826

[22] Filed: May 28, 1999

[30] Foreign Application Priority Data

May 28, 1998 [JP] Japan .................... 10-164304

[51] Int. Cl.[7] ........................... A47C 20/00; A47C 7/50
[52] U.S. Cl. .................... 297/423.36; 297/423.2; 297/423.28; 297/423.3; 297/423.26
[58] Field of Search ................ 297/423.19, 423.2, 297/423.26, 423.28, 423.3, 423.22, 423.23, 423.36, 423.34, 423.35, 423.24

[56] References Cited

U.S. PATENT DOCUMENTS

| | | | |
|---|---|---|---|
| 3,794,381 | 2/1974 | Caldemeyer | 297/423.22 |
| 5,352,020 | 10/1994 | Wade et al. | 297/423.26 |
| 5,507,562 | 4/1996 | Wieland | 297/423.2 |
| 5,560,681 | 10/1996 | Dixon et al. | 297/423.26 |

*Primary Examiner*—Anthony D. Barfield
*Attorney, Agent, or Firm*—Foley & Lardner

[57] ABSTRACT

An ottoman is incorporated with a frame of a seat. The ottoman comprises a pivotal base structure pivotally connected to the seat cushion frame. The pivotal base structure is movable between retracted and projected positions with respect to the seat cushion frame. A sliding board structure is slidably supported by the pivotal base structure. The sliding board structure is movable between retracted and projected positions with respect to the pivotal base structure. An electric drive mechanism is employed for synchronously moving both of the pivotal base structure and the sliding board structure between the retracted and projected positions with the aid of electric power.

9 Claims, 4 Drawing Sheets

AUTOMOTIVE SEAT WITH ELECTRICALLY ACTUATED OTTOMAN

BACKGROUND OF THE INVENTION

1. Field of the Invention

The present invention relates in general to automotive seats, and more particularly to automotive seats of a type having an electrically actuated ottoman. More specifically, the present invention relates to an automotive seat having a foot stool (viz., ottoman) that is moved by an electric actuator between in-use or projected position and non-use or retracted position.

2. Description of the Prior Art

In order to clarify the task of the present invention, one conventional automotive seat of the above-mentioned type will be briefly described, that is shown in Japanese Patent First Provisional Publication 9-206157. That is, in the seat of this publication, with the aid of an electric power, a link mechanism operates to move the ottoman between a projected position and a retracted position. However, due to usage of numerous parts, the link mechanism is compelled to have a bulky construction. Thus, when the seat having such bulky link mechanism is practically mounted in a motor vehicle, the vehicle cabin fails to provide a seat occupant with a sufficient foot space in front of the seat. Furthermore, in the seat disclosed by the publication, even when the ottoman is in the retracted position, the same fails to assume a sufficiently compact posture, which limits the foot space of the vehicle cabin.

SUMMARY OF THE INVENTION

It is therefore an object of the present invention to provide an automotive seat with an electrically actuated ottoman, which is free of the above-mentioned drawback.

In the present invention, there is provided an electrically actuated ottoman which, when assuming a projected position, becomes large in size to provide a seat occupant with a larger foot supporting area, and when assuming a retracted position, becomes compact in size to provide the seat occupant with a larger foot space of the vehicle cabin.

In accordance with a first aspect of the present invention, there is provided an automotive seat which comprises a seat cushion including a frame; and an ottoman incorporated with the frame, the ottoman including a pivotal base structure pivotally connected to the seat cushion frame, the pivotal base structure being movable between a retracted position where the pivotal base structure is positioned close to the seat cushion frame and a projected position where the pivotal base structure is positioned away from the seat cushion frame; a sliding board structure slidably supported by the pivotal base structure, the sliding board structure being movable between a retracted position where the sliding board structure is compactly mounted on the pivotal base structure and a projected position where the sliding board structure is positioned away from the pivotal base structure; and an electric drive mechanism for synchronously moving both of the pivotal base structure and the sliding board structure between the retracted and projected positions with the aid of electric power.

In accordance with a second aspect of the present invention, there is provided an automotive seat which comprises a seat cushion including a frame; an ottoman movably mounted to the frame of the seat cushion, the ottoman including a generally U-shaped supporting frame which includes a laterally extending bridge portion and right and left channel arm portions which extend at generally right angles from both ends of the bridge portion; a pair of double link pivot mechanisms through which the bridge portion of the U-shaped supporting frame is pivotally connected to the frame of the seat cushion; a generally rectangular sliding frame which includes a laterally extending front bridge portion, right and left rod portions and a laterally extending rear bridge portion, the right and left rod portions being slidably received in the right and left channel arm portions the U-shaped supporting frame; an electric motor; an elongate threaded shaft driven by the electric motor to rotate about its axis; means for suppressing an axial movement of the threaded shaft while permitting the rotation of the same; a nut member operatively engaged with the threaded shaft; a link member extending from the nut member; a first pivot structure through which the link member is pivotally connected to the bridge portion of the U-shaped supporting frame; and a second pivot structure through which the link member is pivotally connected to the rear bridge portion of the rectangular sliding frame.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, directional terms and words, such as front, rear, right, left and the like are to be understood with respect to a person who sits on an associated seat.

Figure 1:
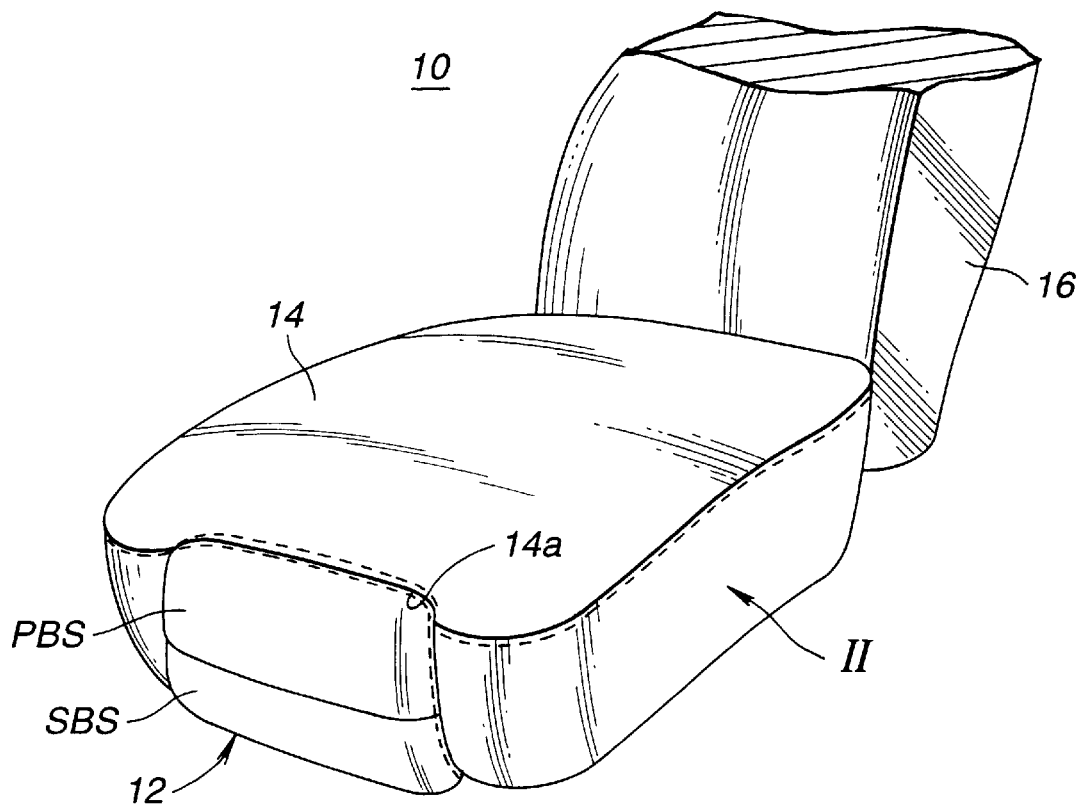
FIG. 1 is an automotive seat with an electrically actuated ottoman, which is an embodiment of the present invention.
Figure 2:
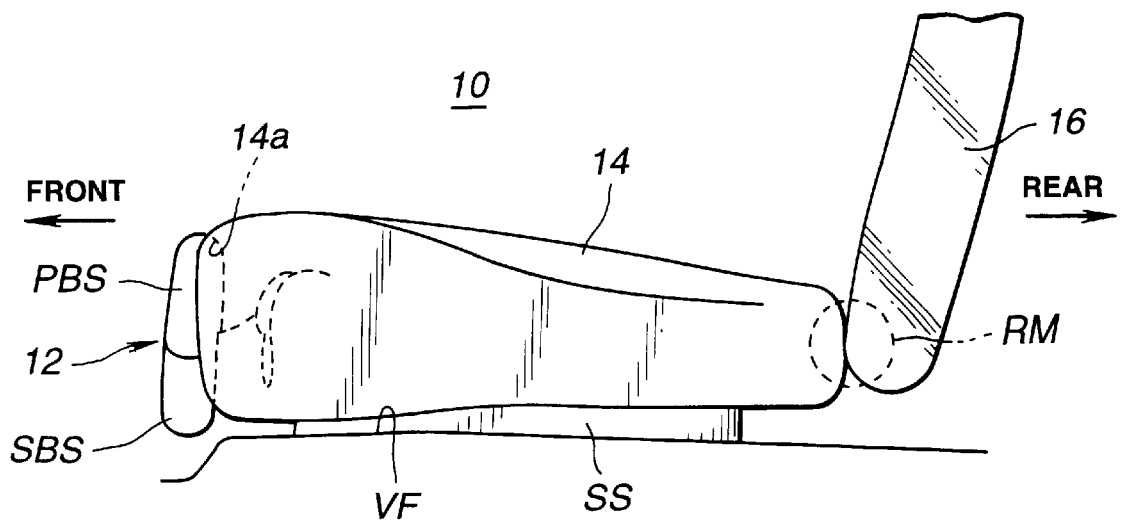
FIG. 2 is a side view of the seat, taken from the direction of arrow "II" of FIG. 1.

Referring to FIGS. 1 and 2 of the drawings, there is shown an automotive seat 10 equipped with an ottoman 12, which is an embodiment of the present invention.

The automotive seat 10 comprises generally a seat cushion 14 mounted on a vehicle floor "VF" (see FIG. 2) through a seat slider "SS", a seatback 16 pivotally mounted on a rear portion of the seat cushion 14 though a reclining mechanism "RM" and the ottoman 12 pivotally connected to a front portion of the seat cushion 14. As will be described in detail hereinafter, the ottoman 12 is arranged to move between a projected position wherein, as is seen from FIG. 5, the ottoman 12 is projected forward from the seat cushion 14 for allowing the seat occupant to put his or her feet thereon and a retracted position wherein, as is seen from FIGS. 1, 2 and 4, the ottoman 12 is neatly received in a recess 14a formed in the front portion of the seat cushion 14.

Figure 3:
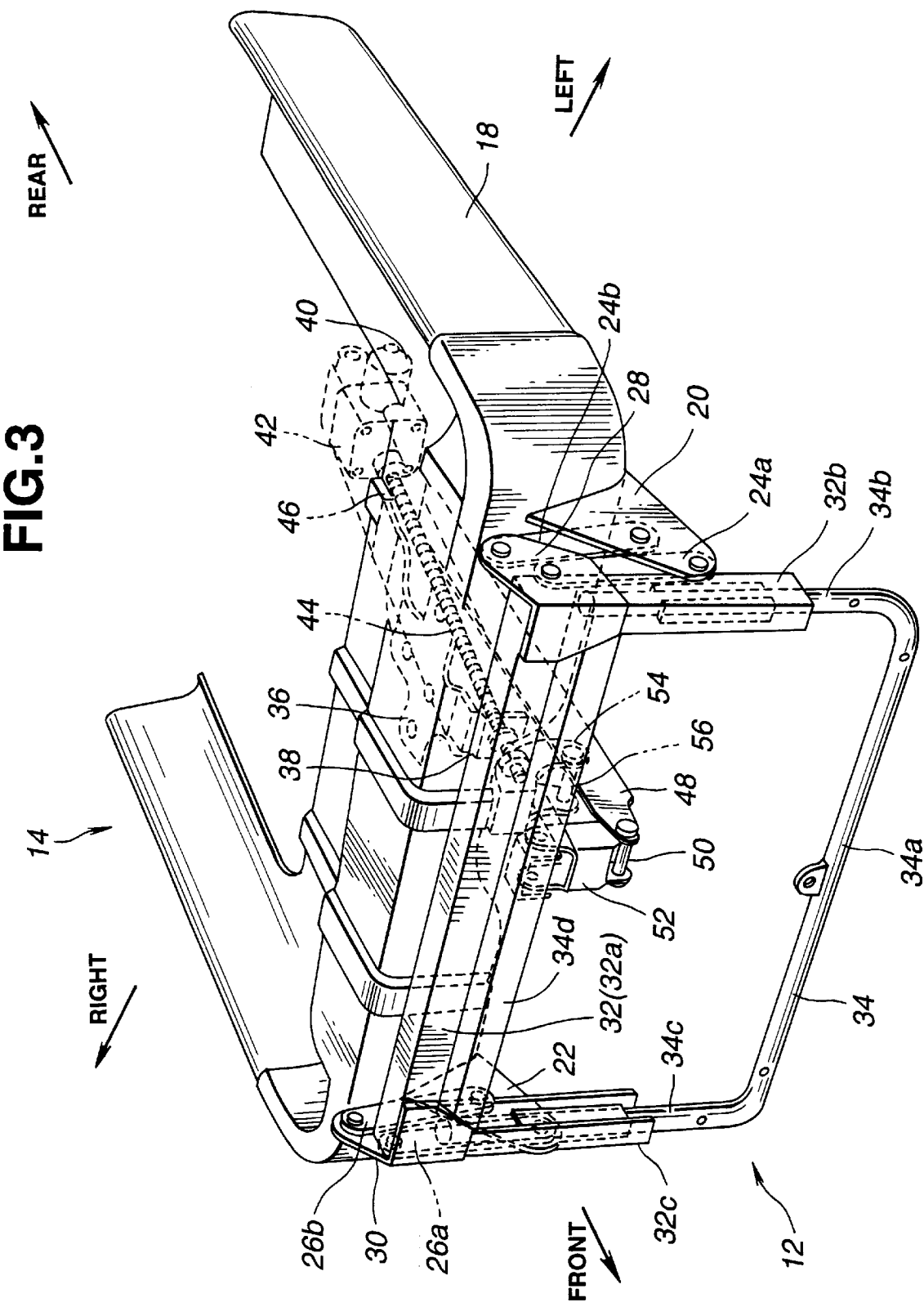
FIG. 3 is a perspective view of a mechanism possessed by the ottoman that the seat of the present invention has.

As is seen from FIG. 3, the seat cushion 14 comprises a rectangular frame 18 (only front part of which is shown). Although not shown in the drawing, springs, cushion pads and an outer skin member are incorporated with the rectangular frame 18 to constitute the seat cushion 14.

Figure 4:
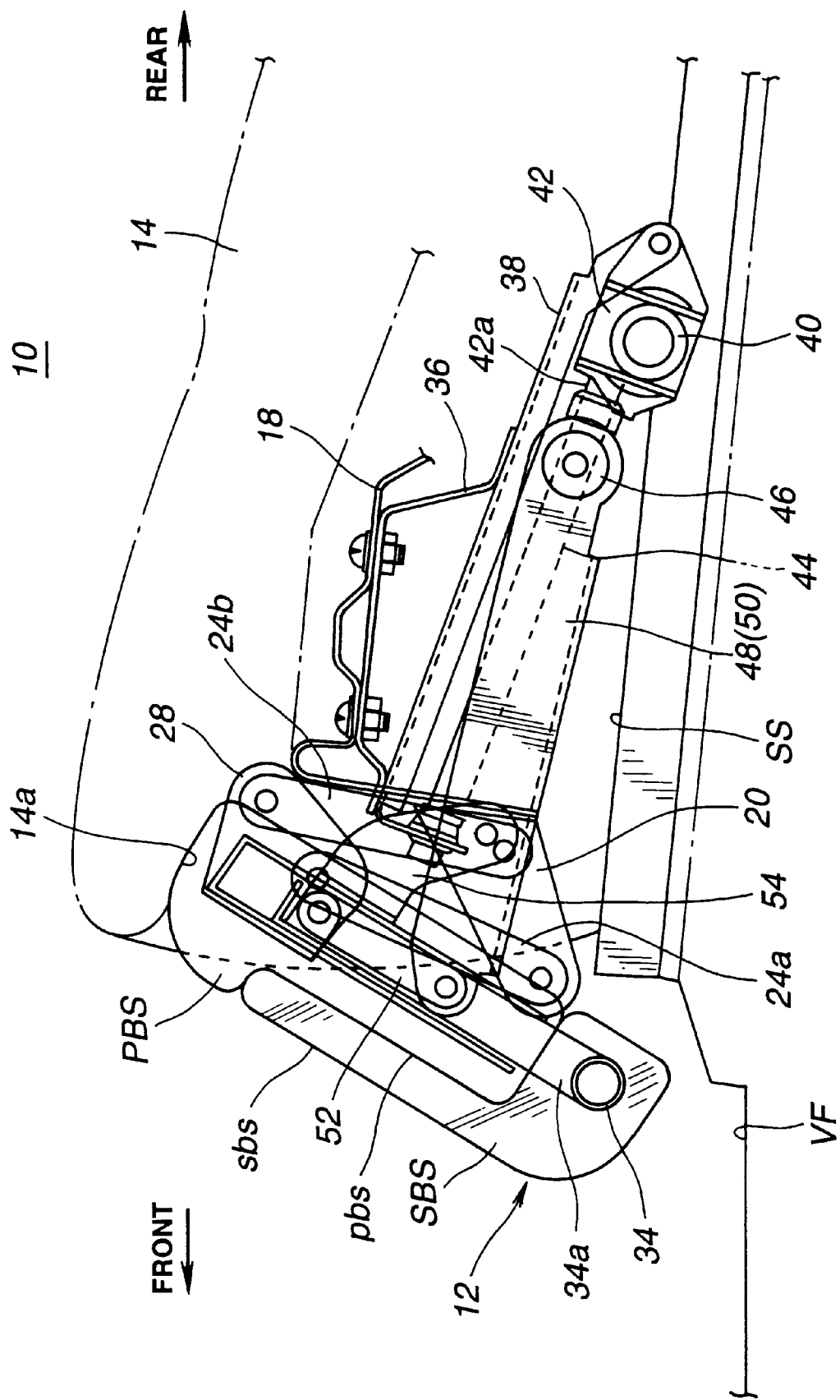
FIG. 4 is a sectional view of the mechanism of the ottoman, showing the ottoman in a retracted position.
Figure 5:
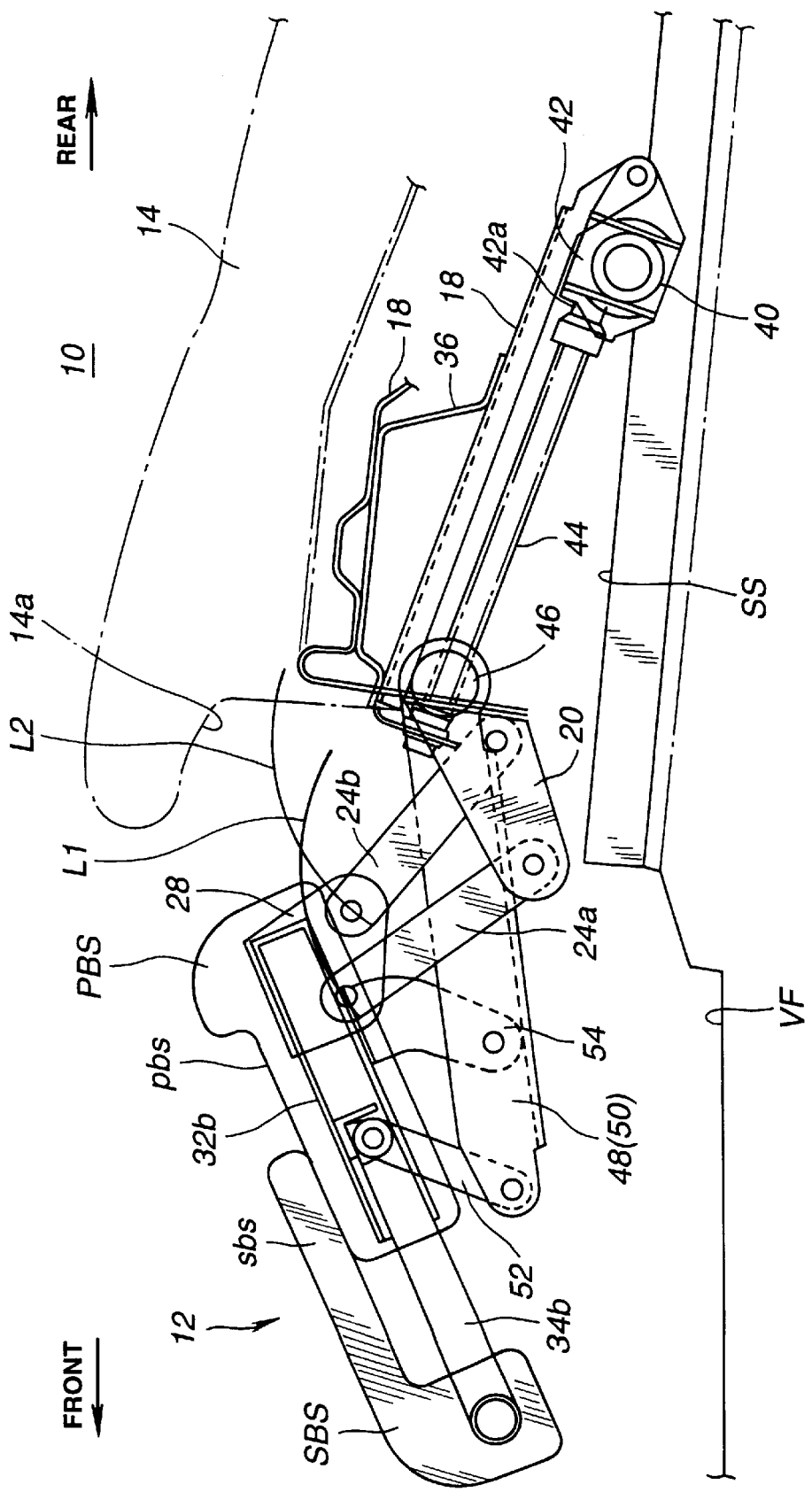
FIG. 5 is a sectional view of the mechanism of the ottoman, showing the ottoman in a projected position.

As is seen from FIGS. 2, 4 and 5, the rectangular frame 18 is mounted on sliding rails of the seat slider "SS". A so-called position stopper (not shown) is associated with the slider "SS" to lock the seat cushion 14 at a desired fore-and-aft position. A height adjuster (not shown) may be arranged between the rectangular frame 18 and the seat slider "SS" to adjust the height of the seat cushion 14.

As is seen from FIGS. 3, 4 and 5, particularly FIG. 3, the ottoman 12 comprises two brackets 20 and 22 which are fixed to front lateral ends of the rectangular frame 18, each being projected forward, as shown. Each bracket 20 or 22 has first and second links 24a and 24b (or, 26a and 26b) which have lower ends pivotally connected to the bracket 20 or 22. The first and second links 24a and 24b (or, 26a and 26b) have substantially equal length. Upper ends of the first and second links 24a and 24b (or, 26a and 26b) are pivotally connected to an L-shaped bracket 28 or 30. These L-shaped brackets 28 and 30 are secured to lateral ends of a generally U-shaped supporting frame 32. The U-shaped supporting frame 32 comprises a laterally extending bridge portion 32a and right and left channel arm portions 32b and 32c each extending at generally right angles from one end of the bridge portion 32a. It is to be noted that each L-shaped bracket 28 or 30 is secured to the junction between the bridge portion 32a and the channel arm portion 32b or 32c. Thus, the U-shaped supporting frame 32 is pivotally supported by the two brackets 20 and 22 through the two pairs of pivotal links 24a, 24b, 26a and 26b.

As will be described in detail hereinafter, when the ottoman 12 is neatly received in the recess. 14a of the seat cushion 14 to assume the retracted position, the second links 24b and 26b stand substantially vertical causing the ottoman 12 to incline about 60 degrees relative to the horizontal line, as is seen from FIG. 4. For achieving this, the distance between the upper pivoted ends of the first and second links 24a and 24b (or, 26a and 26b) is determined smaller than the distance between the lower pivoted ends of the first and second links 24a and 24b (or, 26a and 26b). When the ottoman 12 is brought to the projected position as shown in FIG. 5, the first and second links 24a and 24b (or, 26a and 26b) are both inclined forward. During this, the locus "L2" (see FIG. 5) described by the pivoted upper end of the second link 24b or 26b goes across the locus "L1" described by the pivoted upper end of the first link 24a or 26a.

Referring back to FIG. 3, the U-shaped supporting frame 32 slidably supports a generally rectangular sliding frame 34. The rectangular sliding frame 34 comprises a laterally extending front bridge portion 34a, right and left rod portions 34b and 34c and a laterally extending rear bridge portion 34d. As shown, the right and left rod portions 34b and 34c of the rectangular sliding frame 34 are slidably received in the right and left channel arm portions 32b and 32c of the U-shaped supporting frame 32. Thus, the rectangular sliding frame 34 can slide relative to the U-shaped supporting frame 32 between a retracted position as shown in FIG. 4 and a projected position as shown in FIG. 5.

As is understood from FIGS. 1, 2 and 3, the supporting frame 32 is equipped with cushion pads and an outer skin member (no numeral) to constitute a pivotal base structure "PBS", and the sliding frame 34 is equipped with cushion pads and an outer skin member (no numeral) to constitute a sliding board structure "SBS".

As is seen from FIGS. 3, 4 and 5, a bracket 36 is secured to a lower surface of a front bridge portion of the rectangular frame 18. An elongate case 38 is secured to the bracket 36 and extends obliquely relative to the seat slider "SS". Within the elongate case 38, there is installed a driving mechanism for driving the ottoman 12.

The driving mechanism comprises an electric motor 40, a speed reduction gear 42 operatively connected to an output shaft of the electric motor 40, and an elongate threaded shaft 44 connected at its rear end to an output shaft 42a of the speed reduction gear 42. Preferably, the threaded shaft 44 is of a double spiral type. A front end of the threaded shaft 44 is rotatably supported by a front end portion of the elongate case 38 through a bearing member.

As is seen from FIG. 4, a nut member 46 is operatively engaged with the elongate threaded shaft 44. From the nut member 46, there extend forward two link members 48 and 50. As is seen from FIG. 3, the two link members 48 and 50 are pivotally connected at their front ends to a pivot member 52. The pivot member 52 is pivotally connected to a middle portion of the rear bridge portion 34d of the rectangular sliding frame 34. As will be seen from FIG. 4, when the ottoman 12 assumes the retracted position, the pivot member 52 extends in parallel with the right and left rod portions 34b and 34c of the rectangular sliding frame 34.

The bridge portion 32a of the U-shaped supporting frame 32 is provided at its lower surface with a supporting bracket 54 to which the two link members 48 and 50 are pivotally connected through a pivot pin 56.

In the following, operation will be described with reference to the drawings.

For ease of understanding, the description will be commenced with respect to the retracted condition of the ottoman 12 as shown in FIGS. 1, 2, 3 and 4.

Under this condition, as shown in FIG. 4, the nut member 46 takes a deeper position of the threaded shaft 44 near the speed reduction gear 42, so that the two link members 48 and 50 pull the ottoman 12 to the retracted position, that is, into the recess 14a of the seat cushion 14. As shown, the ottoman 12 is kept inclined about 60 degrees relative to the horizontal line. Under this condition, the sliding board structure "SBS" is fully received by the pivotal base structure "PBS". More specifically, an extended cover portion "sbs" of the sliding board structure "SBS" is fully received in a recessed portion "pbs" formed on the pivotal base structure "PBS".

When now the electric motor 40 is energized to run in a first direction, the threaded shaft 44 is rotated about its axis in a so-called ottoman projecting direction. With this, the nut member 46 is forced to run forward on the threaded shaft 44 pushing the ottoman 12 through the two link members 48 and 50 and the supporting bracket 54. In response to the forward movement of the two link members 48 and 50, the ottoman 12 is moved forward while being raised, as is seen from FIG. 5. During this, the first and second links 24a and 24b (or, 26a and 26b) are pivoted forward about the pivoted lower ends thereof and the locus "L2" described by the pivoted upper end of the second link 24b or 26b goes across the locus "L1" described by the pivoted upper end of the first link 24a or 26a. In response to the raising movement of the ottoman 12, the sliding board structure "SBS" is gradually moved away from the pivotal base structure "PBS" increasing the foot placing area of the ottoman 12.

When, as is seen from FIG. 5, the nut member 46 comes to its frontmost position, a position sensor (not shown) senses the reach of the nut member 46 and stops the energization of the electric motor 40. Upon this, the ottoman 12 stops its projecting movement and keeps the projected position thereof.

When now the electric motor 40 is energized to run in a second direction, the threaded shaft 44 is rotated about its axis in a so-called ottoman retracting direction. With this, the nut member 46 is forced to run rearward on the threaded shaft 44 pulling the ottoman 12 through the two link members 48 and 50 and th supporting bracket 54. In response to the rearward movement of the two link members 48 and 50, the ottoman 12 is moved rearward while being retracted, as is seen from FIG. 4. During this, the first and second links 24a and 24b (or, 26a and 26b) are pivoted rearward about the pivoted lower ends thereof and the locus "L1" described by the pivoted upper end of the first link 24a or 26a goes across the locus "L2" descrisbed by the pivoted per end of the second link 24b or 26b. In response to the retracting movement of the ottoman 12, the sliding board structure "SBS" is gradually moved toward the pivotal base structure "PBS" reducing the foot placing area of the ottoman 12.

When, as is seen from FIG. 4, the nut member 46 comes to its rearmost position, another position sensor (not shown) senses the reach of the nut member 46 and stops the energization of the electric motor 40. Upon this, the ottoman 12 stops is retracting movement and keeps the retracted position thereof.

In the following advantages of the present invention will be described.

When the ottoman 12 assumes the projected position, the foot supporting area defined by the ottoman 12 is increased, which provides a seat occupant with a comfortable foot supporting.

When the ottoman 12 assumes the retracted position, the same is neatly and compactly received in the recess 14a formed in the seat cushion 14. Thus, when the ottoman 12 is not in use, the foot space defined in front of the seat is not so limited.

When the ottoman 12 assumes the retracted position, the sliding board structure "SBS" is compactly combined with the pivotal base structure "PBS", which promotes the compact retraction of the ottoman 12.

Due to usage of the double link pivot mechanism including the first and second links 24a and 24b (or, 26a and 26b), much greater displacement is obtained by the ottoman 12 as compared with a mono-link pivot mechanism.

The entire contents of Japanese Patent Application P10-164304 (filed May 28, 1998) are incorporated herein by reference.

Although the invention has been described above with reference to a certain embodiment of the invention, the invention is not limited to the embodiment described above. Various modifications and variations of the embodiment described above will occur to those skilled in the art, in light of the above teachings.

What is claimed is:

1. An automotive seat comprising:
   a seat cushion including a frame; and
   an ottoman incorporated with said frame, said ottoman including:
      a pivotal base structure pivotally connected to the seat cushion frame, said pivotal base structure being movable between a retracted position where the pivotal base structure is positioned close to the seat cushion frame and a projected position where the pivotal base structure is positioned away from the seat cushion frame;
      a sliding board structure slidably supported by said pivotal base structure, said sliding board structure being movable between a retracted position where the sliding board structure is compactly mounted on said pivotal base structure and a projected position where the sliding board structure is positioned away from said pivotal base structure; and
      an electric drive mechanism for synchronously moving both of said pivotal base structure and said sliding board structure between said retracted and projected positions with the aid of electric power.

2. An automotive seat as claimed in claim 1, in which said seat cushion is provided with a recess in to which said pivotal base structure is neatly received when assuming the retracted position.

3. An automotive seat as claimed in claim 1, in which said pivotal base structure is pivotally connected to said frame through a pair of double link pivot mechanisms each comprising:
   a first bracket secured to said frame;
   a second bracket secured to said pivotal base structure;
   a first link having upper and lower ends pivotally connected to said second and first brackets respectively; and
   a second link having upper and lower ends pivotally connected to said second and first brackets respectively.

4. An automotive seat as claimed in claim 3, in which the distance between the pivoted upper ends of the first and second links is smaller than that between the pivoted lower ends of the first and second links.

5. An automotive seat as claimed in claim 3, in which said electric drive mechanism comprises:
   an electric motor;
   an elongate threaded shaft rotatably supported by said frame and driven by said electric motor;
   a nut member operatively engaged with said threaded shaft;
   a link member extending from said nut member;
   a first pivot structure through which said link member is pivotally connected to said pivotal base structure; and
   a second pivot structure through which said link member is pivotally connected to said sliding board structure.

6. An automotive seat as claimed in claim 5, in which said electric drive mechanism further comprises a speed reduction gear through which an output shaft of said electric motor and said threaded shaft are connected.

7. An automotive seat as claimed in claim 5, in which said first pivot structure comprises a supporting bracket secured to said pivotal base structure; and a pivot pin through which said link member is pivotally connected to said supporting bracket, and in which said second pivot structure comprises a pivot member which has one end pivotally connected to said sliding board structure and the other end pivotally connected to a front end of said link member.

8. An automotive seat as claimed in claim 1, in which said pivotal base structure comprises a generally U-shaped supporting frame which includes a laterally extending bridge portion; and right and left channel arm portions which extend at generally right angles from both ends of said bridge portion, and in which said sliding board structure comprises a generally rectangular sliding frame which includes a laterally extending front bridge portion, right and left rod portions and a laterally extending rear bridge portion, said right and left rod portions being slidably received in the right and left channel arm portions of said U-shaped supporting frame.

9. An automotive seat comprising:
   a seat cushion including a frame;
   an ottoman movably mounted to the frame of said seat cushion, said ottoman including:
      a generally U-shaped supporting frame which includes a laterally extending bridge portion and right and left channel arm portions which extend at generally right angles from both ends of said bridge portion;

a pair of double link pivot mechanisms through which said bridge portion of said U-shaped supporting frame is pivotally connected to the frame of said seat cushion;

a generally rectangular sliding frame which includes a laterally extending front bridge portion, right and left rod portions and a laterally extending rear bridge portion, the right and left rod portions being slidably received in the right and left channel arm portions the U-shaped supporting frame;

an electric motor;

an elongate threaded shaft driven by said electric motor to rotate about its axis;

means for suppressing an axial movement of said threaded shaft while permitting the rotation of said the same;

a nut member operatively engaged with said threaded shaft;

a link member extending from said nut member;

a first pivot structure through which said link member is pivotally connected to the bridge portion of said U-shaped supporting frame; and a second pivot structure through which said link member is pivotally connected to the rear bridge portion of said rectangular sliding frame.

* * * * *